United States Patent
Foster et al.

(10) Patent No.: US 8,144,050 B1
(45) Date of Patent: *Mar. 27, 2012

(54) REMOVING CLUTTER FROM RADAR CROSS SECTION MEASUREMENTS USING SPECTRAL TAGGING

(75) Inventors: John D. Foster, East Tacoma, WA (US);
Douglas P. Morgan, Auburn, WA (US);
Scot J. McLean, Renton, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/034,852

(22) Filed: Feb. 25, 2011

Related U.S. Application Data

(63) Continuation of application No. 12/369,273, filed on Feb. 11, 2009, now Pat. No. 7,916,067.

(51) Int. Cl.
*G01S 7/41* (2006.01)
(52) U.S. Cl. ......................... 342/159; 342/165
(58) Field of Classification Search .................. 342/159, 342/165
See application file for complete search history.

(56) References Cited

U.S. PATENT DOCUMENTS

| | | | |
|---|---|---|---|
| 4,058,002 A | 11/1977 | Moran | |
| 4,431,970 A | 2/1984 | Sumi et al. | |
| 4,733,202 A | 3/1988 | Forterre et al. | |
| 5,486,830 A * | 1/1996 | Axline et al. | 342/43 |
| 5,534,873 A * | 7/1996 | Weichman et al. | 342/165 |
| 5,959,570 A * | 9/1999 | Russell | 342/70 |
| 6,011,507 A * | 1/2000 | Curran et al. | 342/70 |
| 6,104,336 A * | 8/2000 | Curran et al. | 342/70 |
| 6,107,956 A * | 8/2000 | Russell et al. | 342/70 |
| 6,114,985 A * | 9/2000 | Russell et al. | 342/169 |
| 7,375,676 B1 * | 5/2008 | Loberger | 342/160 |
| 7,423,608 B2 | 9/2008 | Dunn et al. | |
| 7,528,788 B2 | 5/2009 | Dunn et al. | |
| 7,808,422 B1 * | 10/2010 | Woodell et al. | 342/26 B |
| 7,916,067 B2 | 3/2011 | Foster et al. | |
| 2006/0244827 A1 * | 11/2006 | Moya et al. | 348/143 |

OTHER PUBLICATIONS

Knott, E.F., et al., Radar Cross Section: Its Prediction, Measurement and Reduction, Archer House, pp. 315-411 (Jul. 21, 1986).
Ruck, George T., et al., Radar Cross Section Handbook, vol. 1, Plenum Press, New York-London, pp. 289-290 (1970).

* cited by examiner

*Primary Examiner* — Thomas Tarcza
*Assistant Examiner* — Matthew M Barker
(74) *Attorney, Agent, or Firm* — Charles L. Moore; Moore & Van Allen PLLC

(57) ABSTRACT

A system for performing radar cross section measurements of a target may include a radar system and an antenna associated with the radar system to transmit signals and to receive reflected signals from the target and a clutter source. An EM tagging device is locatable proximate to the clutter source to spectrally tag the clutter source by causing changes in an electromagnetic signal reflected by the clutter source when a predetermined radar signal transmitted by the radar system is incident on the target, the clutter source and the EM tagging device. A module may identify a spectrally tagged component of reflected signals received by the radar system from the target, the clutter source and the EM tagging device. The module monitors the spectrally tagged component, compensates for variations in an un-tagged component of the reflected signals caused by the clutter source and EM tagging device, and subtracts contamination caused by the clutter source and EM tagging device and their interactions with the target, to provide a radar cross section of the target with reflected signals from the clutter source removed.

18 Claims, 7 Drawing Sheets

REMOVING CLUTTER FROM RADAR CROSS SECTION MEASUREMENTS USING SPECTRAL TAGGING

CROSS-REFERENCE TO RELATED APPLICATIONS

This application is a continuation of co-pending U.S. patent application Ser. No. 12/369,273 filed on Feb. 11, 2009, entitled "Removing Clutter from Radar Cross Section Measurements Using Spectral Tagging," the entire disclosure of which is hereby incorporated by reference herein for all purposes.

FIELD

The present disclosure relates to radar systems and performing radar cross section measurements, electromagnetic (EM) scattering measurements or similar measurements, and more particularly to removing clutter from radar cross section measurements or EM scattering measurements using spectral tagging.

BACKGROUND

Performing electromagnetic (EM) scattering measurements in the presence of clutter sources or objects which can reflect or scatter electromagnetic or radar test signals or fields can adversely affect such measurements. The scattered or reflected signals or fields from the clutter source can interact or interfere with the desired scattered or reflected signals from the target under test. Conventional methods of vector background subtraction do not work effectively when there are large interactions between the target-under-test and the clutter source. Examples of such clutter sources are Target Support Systems used to mount Radar Cross Section (RCS) Targets in both indoor and outdoor RCS ranges. These supports can severely contaminate the RCS of the Target return, and, under certain common situations, can interact significantly with the target-under-test. The ability to identify such target support contamination and other clutter sources and the interaction between such clutter sources and the target would allow the removal of these contaminants and the retrieval of accurate RCS target data.

Currently known systems and methods for removing the effects of clutter sources involve hardware solutions, software solutions and a combination of hardware and software solutions. Hardware methods generally attempt to reduce the RCS of the clutter through shaping the clutter source, selecting the materials from which the clutter source is constructed, treatment of the materials of the clutter source or some combination of these techniques to substantially reduce or eliminate the scattering or contamination by the clutter source. Such hardware solutions may not completely eliminate the clutter contamination to desirable or acceptable levels. Even for large targets, a very small amount of clutter contamination may create an undesirable degradation in the data.

Software solutions may generally involve combinations of vector background subtraction, image editing and reconstruction and Doppler filtering. Software solutions typically cannot account for the interactions between the clutter and the target. Accordingly such solutions may be ineffective when these interactions are significant or common. For example, vector background subtraction involves a measurement of the clutter without the target, and then a measurement of the target in the presence of the clutter. Subtracting the latter from the former yields the target return and the interactions when both the clutter and target are present. Under certain conditions, these interactions can be as large a contaminant as the clutter alone, so the result can still be significantly degraded.

BRIEF SUMMARY

In accordance with an embodiment, a system and method are disclosed which permit unique identification of contaminating signals or fields from clutter sources with the target present and without disturbing existing fields or the target RCS. Clutter contamination signals or fields including interaction between the target and the clutter can be identified and removed by spectral tagging of the clutter sources using an electromagnetic (EM) tagging device or EM surface. The tagging device may be modulated between two or more distinct RCS states to spectrally tag the clutter source. The fields reflected from the clutter source and EM tagging device or EM surface contains both tagged and un-tagged components.

In accordance with an embodiment, a system for performing radar cross section measurements of a target may include a radar system and an antenna associated with the radar system to transmit signals and to receive reflected signals from the target and a clutter source. An EM tagging device is locatable proximate to the clutter source to spectrally tag the clutter source by causing changes in an electromagnetic signal reflected by the clutter source when a predetermined radar signal transmitted by the radar system is incident on the target, the clutter source and the EM tagging device. A module associated with the radar system may identify a spectrally tagged component of reflected signals received by the radar system from the target, the clutter source and the EM tagging device. The module monitors the spectrally tagged component of the reflected signals received by the radar system, compensates for variations in an un-tagged component of the reflected signals caused by the clutter source and EM tagging device, and subtracts contamination caused by the clutter source and EM tagging device and their interactions with the target, to provide a radar cross section of the target with reflected signals from the clutter source removed. An output device may present the radar cross section of the target with the reflected signals from the clutter source removed.

In accordance with another embodiment, a system for performing radar cross section measurements of a target may include a first coherent signal generator to generate a test signal at a selected test frequency. A first power divider may split the test signal into an un-modulated transmit test signal to be transmitted by the system to the target and a first sample of the transmit test signal. A second power divider may split the first sample of the transmit test signal into a second sample of the transmit test signal and a third sample of the transmit test signal. The second sample of the transmit test signal may be a reference signal for use in detecting un-modulated reflected signals received by the system. The system may also include a second coherent signal generator to generate a tagging signal at the selected test frequency shifted or offset by a chosen spectral tagging modulation frequency. A third power divider may split the tagging signal into a first sample tagging signal and a second sample tagging signal. A mixer may be provided to mix the first sample tagging signal and the third sample of the transmit test signal. An output signal from the mixer may be useable to drive an EM tagging device to spectrally tag a clutter source. A receive path power divider may split reflected signals received by the system into a first sample of the received reflected signals and a second sample of the received reflected signals. The reflected signals received by the system include both un-modulated components from the target, clutter source and EM tagging device, and modulated components from the clutter source and EM tagging device only. A first coherent receiver may detect a time-average of un-modulated components of the first sample received reflected signals using the second sample of the transmit test signal as the reference signal, wherein the reference signal is un-modulated. A second coherent receiver may be provided to detect a time-average of modulated components of the second sample received reflected signals using the second sample tagging signal. A module is provided to determine the radar cross section of the target with reflected signals from the clutter source removed by monitoring the time-average of the modulated components of the received reflected signals, adjusting the time-average of a contribution of the clutter source and EM tagging surface to the un-modulated components, and subtracting these adjusted components of the received reflected signals from the received reflected signals. An output device may present the radar cross section of the target with reflected signals from the clutter source and EM tagging device removed.

In accordance with another embodiment, a system for performing radar cross section measurements of a target may include a coherent signal generator to generate a test signal at a selected test frequency. A power divider may be provided to split the test signal into an un-modulated transmit test signal to be transmitted by the system and a sample of the transmit test signal. A radio frequency (RF) pulse forming switch may form the un-modulated transmit test signal into pulses for transmission to the target. A pulse generator may control timing of the RF pulse forming switch. A counter may receive pulse signals from the pulse generator to provide a modulated tagging signal that changes state with each pulse at a predefined modulation frequency. The modulated tagging signal is useable to toggle an EM tagging device between a first radar cross section state and a second radar cross section state to spectrally tag a clutter source. A coherent receiver may be used to detect reflected signals received by the system. A signal processor may process the reflected signals to provide a radar cross section of the target with reflected signals from the clutter source and EM tagging device removed. The system may also include an output device to present the radar cross section of the target with reflected signals from the clutter source and EM tagging device removed.

In accordance with another embodiment, a method for performing radar cross section measurements of a target may include transmitting a predetermined signal to the target and transmitting a spectral tagging signal to an EM tagging device located proximate to a clutter source to spectrally tag the clutter source. The EM tagging device may spectrally tag the clutter source by causing changes in an electromagnetic signal reflected by the clutter source when the predetermined signal is transmitted to the target, the clutter source and the EM tagging device. The method may also include receiving reflected signals from the target, the clutter source and the EM tagging device. Contributions of the clutter source and the EM tagging device to an un-modulated component of the received reflected signals may be determined by monitoring variations in a modulated component of the received reflected signals. The method may further include adjusting for the variations in the un-modulated component to remove contributions of the clutter source and the EM tagging device and any interactions with the target from the received reflected signals to provide the radar cross section of the target without influence of the clutter source. The radar cross section of target may be presented without influence of the clutter source.

In accordance with another embodiment, a method for performing radar cross section measurements of a target may include transmitting test pulse signals at a selected pulse repetition frequency to the target. The method may also include generating tagging pulses to toggle a spectral tagging device between a first RCS state and a second RCS state with each successive tagging pulse, wherein even numbered pulses correspond to the first RCS state and odd numbered pulses correspond to the second RCS state. The spectral tagging device is placed proximate to a clutter source to spectrally tag the clutter source. The method may also include computing a sum of the even and odd numbered reflected pulses to represent un-modulated reflected signals and computing a difference of the even and odd numbered reflected pulses to represent modulated reflected signals. The radar cross section of the target without interference of the clutter source may be determined by monitoring the modulated reflected signals to detect variations in contributions from the clutter source and EM tagging device to the un-modulated reflected signals. Adjusting for this variation allows the removal of these contributions from the combined reflected signal.

In accordance with another embodiment, a method for performing radar cross section measurements of a target may include transmitting a predetermined signal at a selected frequency with only a clutter source and spectral tagging device in a RCS range. The method may also include driving the spectral tagging device to cause a periodic time varying change of the spectral tagging device between a first RCS state and a second RCS state at a chosen frequency to produce clutter source scattering at the selected frequency and a sideband frequency that is a combination of the selected frequency and the chosen frequency. The scattered signals at the selected frequency and the sideband frequency may be measured without the target in the RCS range. A ratio of the scattered signals, without the target in the RCS range, at the selected frequency to the scattered signals at the sideband frequency may be determined. The predetermined signal may again be transmitted at the selected frequency with the target in the RCS range and the EM tagging device may be driven to cause the periodic time varying change of the spectral tagging device between the first RCS state and the second RCS state at the chosen frequency. Scattered signals may be measured at the selected frequency and the sideband frequency. Which scattered signals are from the clutter source at the selected frequency may be determined by multiplying the ratio of the scattered signals at the selected frequency without the target in the RCS range to the scattered signals at the sideband frequency without the target in the RCS range times the scattered signals at the sideband frequency with the target in the RCS range. A radar cross section of the target may be determined by subtracting the scattered signals from the clutter source from an average scattered signal with the target in the RCS range at the selected frequency with the spectral tagging device being driven between the first and second RCS states.

Other aspects and features of the present invention, as defined solely by the claims, will become apparent to those ordinarily skilled in the art upon review of the following non-limited detailed description of the invention in conjunction with the accompanying figures.

BRIEF DESCRIPTION OF THE SEVERAL VIEWS OF THE DRAWINGS

The following detailed description of embodiments refers to the accompanying drawings, which illustrate specific embodiments of the invention. Other embodiments having different structures and operations do not depart from the scope of the present disclosure.

DETAILED DESCRIPTION

The following detailed description of embodiments refers to the accompanying drawings, which illustrate specific embodiments of the invention. Other embodiments having different structures and operations do not depart from the scope of the present invention.

Figure 1:
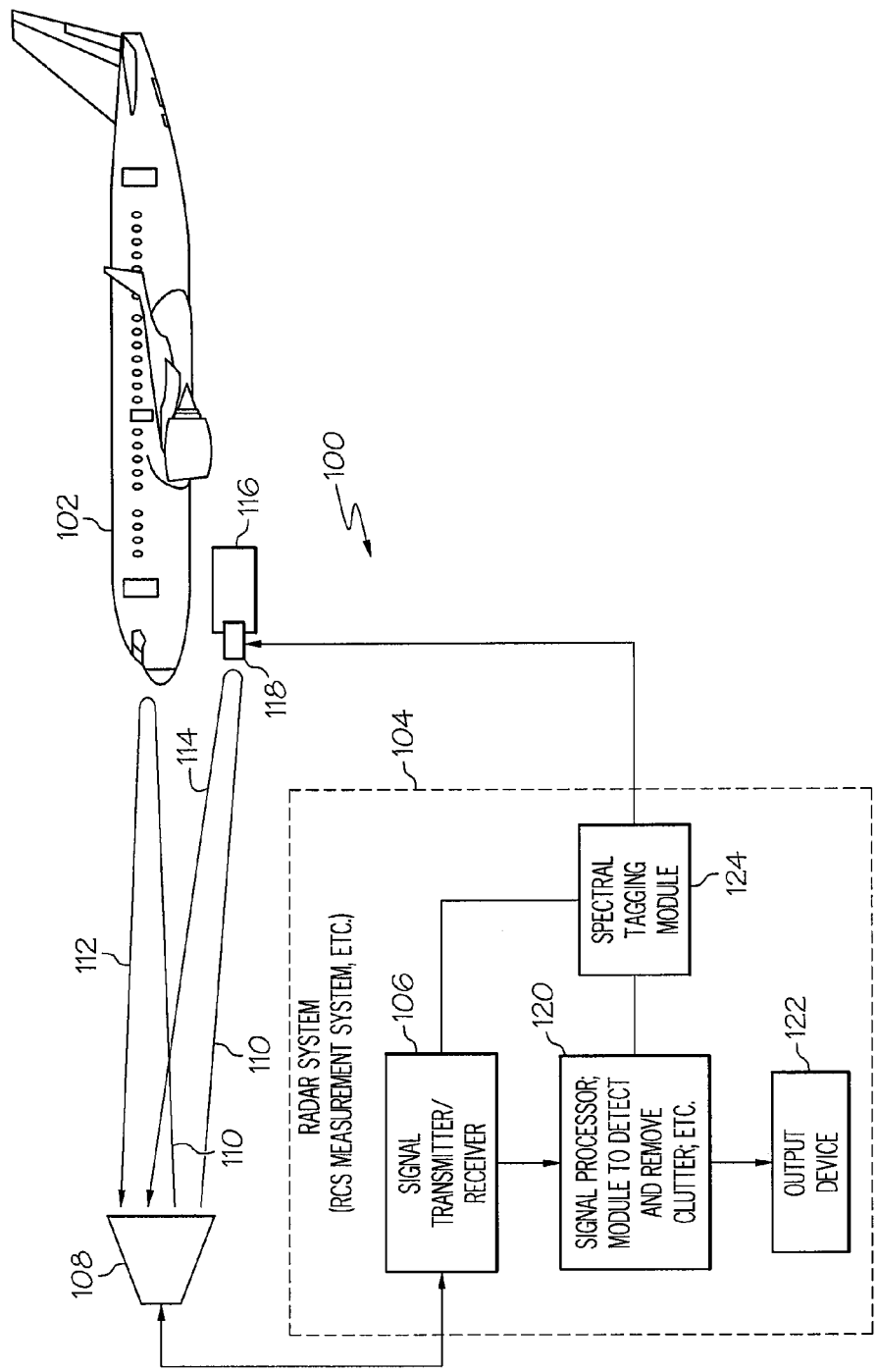
FIG. 1 is a block schematic diagram of an exemplary system for measuring a radar cross section of a target and removing clutter from the radar cross section measurement in accordance with an embodiment of the present disclosure.

FIG. 1 is a block schematic diagram of an exemplary system 100 for measuring a radar cross section of a target 102 and removing clutter from the radar cross section measurement in accordance with an embodiment of the present disclosure. The system 100 may include a radar system 104 or RCS measurement system. The radar system 104 may include a RF or radar signal transmitter and receiver or combination transmitter and receiver 106. An antenna 108 may be associated with or coupled to the radar system 104 to transmit signals 110 and receive reflected signals 112 and 114 reflected or scattered from the target 102 and any clutter sources 116, respectively.

The system 100 may also include an EM tagging device 118. The EM tagging device 118 is locatable proximate to the clutter source 116 to spectrally tag the clutter source 116 by causing changes in the electromagnetic signal 114 reflected by the clutter source 116 when a predetermined radar signal 110 transmitted by the radar system 104 via antenna 108 is incident on the target 102, the clutter source 116 and the EM tagging device 118.

The system 100 may also include a signal processor and/or module 120 to detect and remove clutter or reflected signals from the clutter source 116. The module 120 may be associated with or integrally formed as part of the radar system 104 or RCS measurement system. The module 120 or signal processor may identify a spectrally tagged component of the reflected signals 112 and 114 received by the radar system 104 from the target 102, the clutter source 116 and the EM tagging device 118. The spectrally tagged component of the reflected signals 112 and 114 may be removed or subtracted from a combined reflected signal received by the radar system 104, as described in more detail herein, to provide a radar cross section of the target 102 with the reflected signals from the clutter source 116 and EM tagging device 118 and any electromagnetic interaction between the clutter source 116 and the target 102 removed. Electromagnetic interaction or RF interaction between the combined clutter source 116 and EM tagging device 118 and the target 102 may involve any secondary or higher order reflected signals or EM fields reflected or scattered from the combined clutter source 116 and the EM tagging device 118 to the target 102 and reflected or scattered from the target 102 back to the antenna 108 and radar system 104, or alternately reflected or scattered from the target 102 to the combined clutter source 116 and the EM tagging device 118 and back to the antenna 108.

The module 120 monitors the spectrally tagged component of the reflected signals or modulated return signals received by the radar system 100. The module 120 compensates for variations in un-modulated return signals or an un-tagged component of the reflected signals caused by the clutter source 116 and EM tagging device 118. Contamination caused by the clutter source 116 and EM tagging device 118 and their interactions with the target 102 are removed from the reflected signal to provide a radar cross section of the target 102 with reflected signals from the clutter source 116 and EM tagging device 118 and any electromagnetic interaction between the clutter source 116 and the target 102 removed.

An output device 122 may be associated with the radar system 104 to present the radar cross section of the target 102 or a representation of the radar cross section of the target 102 with reflected or scattered signals from the clutter source 116 and tagging device 118 and any interaction between the clutter source 116 and target 102 removed. The output device 122 may be a monitor or display, a printer or other device capable of presenting the RCS to a user.

The radar system 104 may also include a spectral tagging module 124. The spectral tagging module may generate spectral tagging signals to drive the EM tagging device 118 to cause the tagging device 118 to change or modulate between radar cross section states to spectrally tag the clutter source 116 as described in more detail herein.

Figure 2:
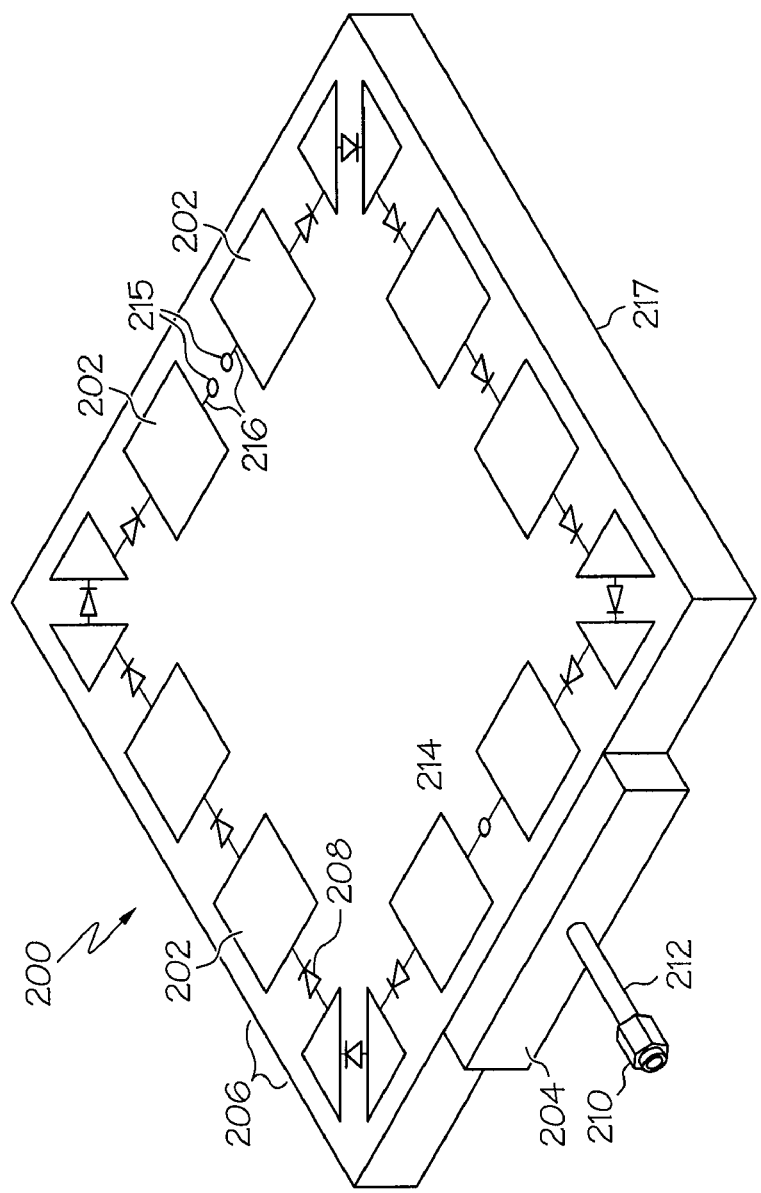
FIG. 2 is a schematic diagram of an example of an electromagnetic (EM) tagging device or EM surface in accordance with an embodiment of the present disclosure.
Figure 3:
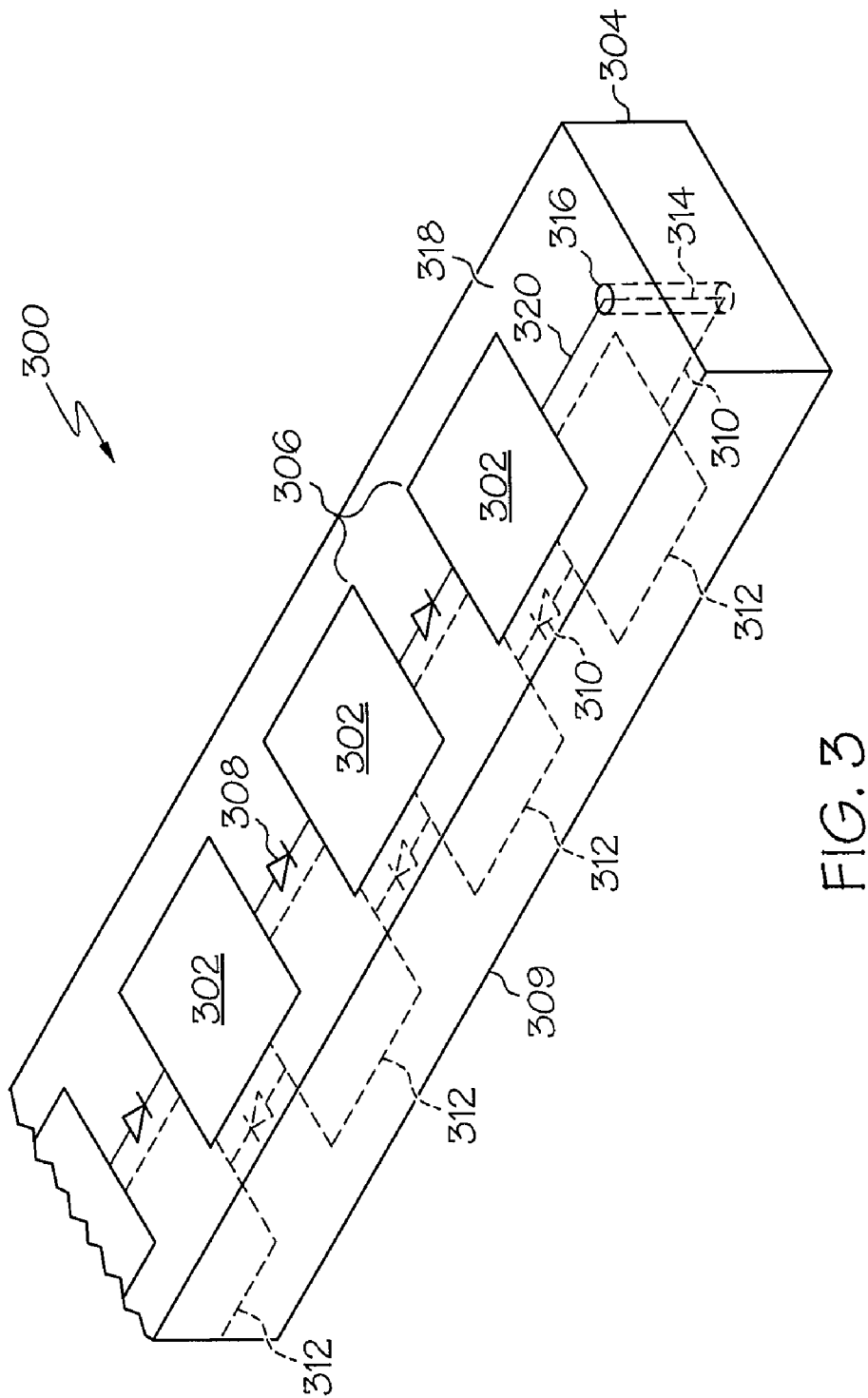
FIG. 3 is a schematic diagram of an example of an EM tagging device or EM surface in accordance with another embodiment of the present disclosure.

The EM tagging device 118 may be an EM surface or any device for which the radar cross section can be changed or modulated electronically. Examples of EM surfaces are illustrated in FIGS. 2 and 3. In the example of FIG. 2, the EM surface 200 consists of a plurality of conductive or metallic elements 202 that are disposed in parallel on both sides of a substrate 204 at a predetermined spacing from one another forming a gap 206 between adjacent conductive elements 202 except for the two conductive elements directly below a coax connector 210 and cable 212 which form a single conductive element serving as the ground connection for the outer shield of the coax cable 212. The substrate 204 may be substantially rectangular or square shaped and made from a dielectric material. The elements 202 may also be substantially square or rectangular shaped with triangular shaped elements at the corners of the substrate 202 as illustrated in FIG. 2. The elements 202 may form a loop around the perimeter on both sides of the substrate 204 forming two parallel conductive paths separated by parallel gaps 206 allowing improved impedance matching to the coax connector 210 and cable 212. FIG. 2 shows the entry point of the coax cable 212 center conductor 214 from below, through the substrate 204 and attached to two diodes thence connected to conductive elements 202 on either side of the entry point or center conductor 214. Two holes 215 and conductors 216 carry the connection from the two conductive elements 202 on either side of the two holes 215 and conductors 216 and thence to the bottom layer or underside 217 of the substrate 204 and then connected to corresponding conductive elements 202 (not visible in FIG. 2) on the bottom layer or underside 217 of the substrate 204. The elements 202 may be interconnected across each gap 206 by a diode 208 or field effect transistor (FET). The diodes 208 are so arranged that currents flow from the coax cable 212 center conductor 214 around either side of the EM surface 200, through the holes 215 and conductors 216 and then reversing directions on the lower surface or underside 217 of the substrate 204 to the single conductive element serving as the ground connection for the outer shield of the coax cable 212. If the diodes 208 or FETs are forward biased, current can flow between the elements 202 and the EM surface 200 may appear electrically as a continuous conductive loop. If the diodes 208 or FETs are unbiased or are off, the EM surface 200 will appear electrically as a collection of short unconnected conductive elements 202. Accordingly, the RCS will be significantly different between the two cases or states.

In the example of FIG. 3, the EM surface 300 may be a straight line of conductive elements 302 disposed on either side of a substrate 304 with a predetermined spacing between adjacent elements 302 forming a gap 306. A diode 308 or FET may interconnect each of the elements 302 on both sides of substrate 304 with a "return" path to the lower or under side 309 of the substrate 304 with oppositely directed diodes 310 and elements 312 on the under side 309. Similar to EM surface 200 a coax cable 314 is used to feed thru a hole 316 in the substrate 304 from the under side of 309 of the substrate 304 and "return" current to an upper side of 318 to a coax cable outer conductor 320. The diodes 308 and 310 or FETs may be biased to appear electrically as one long wire segment or may be unbiased to appear electrically as a linear collection of short wire or conductive elements 302 and 312. Again the RCS of each of these two states will be different.

In the examples of using diodes in EM surfaces 200 and 300, two distinct RCS states can be created. If FETs are used, multiple different RCS states may be created as the resistance across the gaps 206 and 306 may be continuously varied with the bias voltage. Further description of EM surfaces may be found in Ruck, G. T. et al., *Radar Cross Section Handbook, Vol.* 1, 1970, Plenum Press, N.Y. pp. 289-290.

The EM surface 200 or 300 or EM tagging device 118 can "sense" changes in the local fields within a close proximity of the EM surface 200 or 300 by the EM surface 200 or 300 having a variable RCS. The intensity of the reflected fields of the EM tagging device 118 or surface 200, 300 is a product of the RCS and the local fields. By modulating the RCS of the EM surface 200, 300 or EM tagging device 118, the intensity of the reflected fields from the vicinity of the EM tagging device 118 are also modulated. Reflected fields from other regions (without a modulated EM surface or tagging device) are not modulated. Therefore, all reflected signals that contain the modulation can be determined to have come from the vicinity of the EM surface 200, 300 or tagging device 118 only, and nowhere else.

The absolute value of the local fields in the vicinity of the EM tagging device 118 is not important. What is critical is being able to determine "changes" in the local fields due to the insertion of an additional scatterer or target. After the modulated and un-modulated components of the reflected signals are separated, the modulated components can be observed for changes in reflected fields with and without the target 102 present. These changes are proportional to the change in the local fields in the vicinity of the EM tagging device 118 due to the presence of the target 102. Since the clutter source 116, by itself, has a constant RCS, and since the reflected fields are proportional to the product of the RCS and the local fields, determining the changes in the local fields allows a determination of the changes in the reflected fields from the clutter source 116. Accordingly, placing the EM tagging device 118 proximate to the clutter source 116, effectively "tags" the reflected fields or signals from the clutter source 116.

Employing proper design of the EM tagging device 118 and associated clutter source 116, the reflected disturbance of the target fields are insignificant. There will be some small perturbation due to un-tagged (un-modulated) reflections from the clutter source 116 in the direction of the target 102. However, this field or signal will, in general, be extremely small compared to the incident fields of the radar system 104 or instrumentation radar, and can usually be considered negligible. EM tagging device 118 can be selected or designed to substantially minimize the effect of any un-modulated reflected fields or signals.

Examples of a radar system or radar cross section measurement device 104 including components or modules for spectral tagging, signal processing and detecting and removing clutter will be described with reference to FIGS. 4 and 5 below. In one embodiment of the system 100 similar to that illustrated in FIG. 4, the radar system 104 may include a spectral tagging module 124 to generate a coherent sinusoidal modulated signal at a selected modulation frequency to drive the EM tagging device 118. The selected frequency is offset from an un-modulated test frequency of the predetermined radar signal 110 transmitted by the antenna 108. A separate receive channel offset from the test frequency by the selected modulation frequency separates modulated and un-modulated components of the received reflected signals to provide the radar cross section of the target with interference from the clutter source removed.

Figure 5:
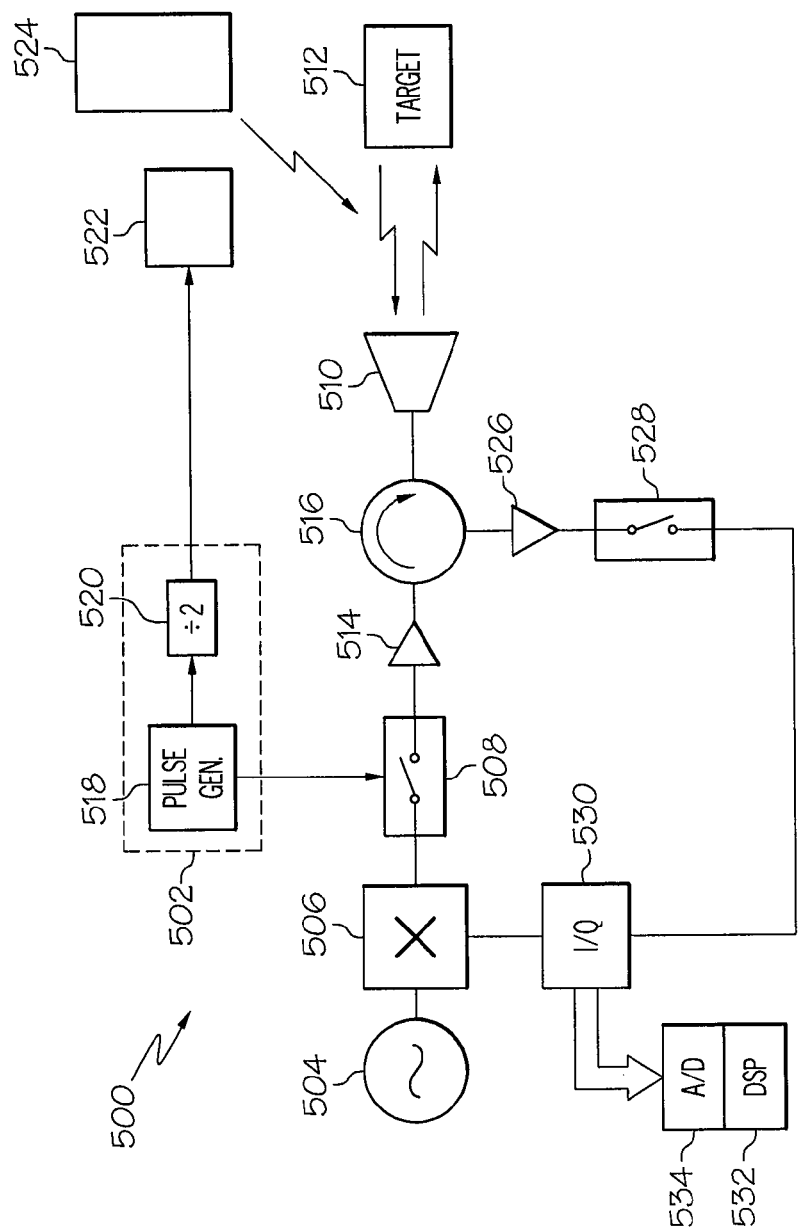
FIG. 5 is a schematic diagram another example of a radar cross section measurement device including a spectral tagging module in accordance with another embodiment of the present disclosure.

In another embodiment similar to that illustrated in FIG. 5, the radar system 104 may include a spectral tagging module 124 to generate a square wave modulated signal at a selected pulse repetition frequency different from a pulse repetition frequency of the predetermined radar signal 110 to drive the EM tagging device 118. The EM tagging device 118 may be toggled between two distinct radar cross section states with each pulse of the square wave modulated signal. The signal processor 120 separates modulated and un-modulated components of the received reflected signals to provide the radar cross section of the target with interference from the clutter source removed. Even numbered pulses of the received reflected signals represent a first radar cross section state of the EM tagging device 118 and odd numbered pulses of the received reflected signals represent a second radar cross section state of the EM tagging device 118. A sum of the even and odd pulses represents the un-modulated components of the received reflected signal and a difference of the even and odd pulse represents the modulated components of the received reflected signal.

Figure 4:
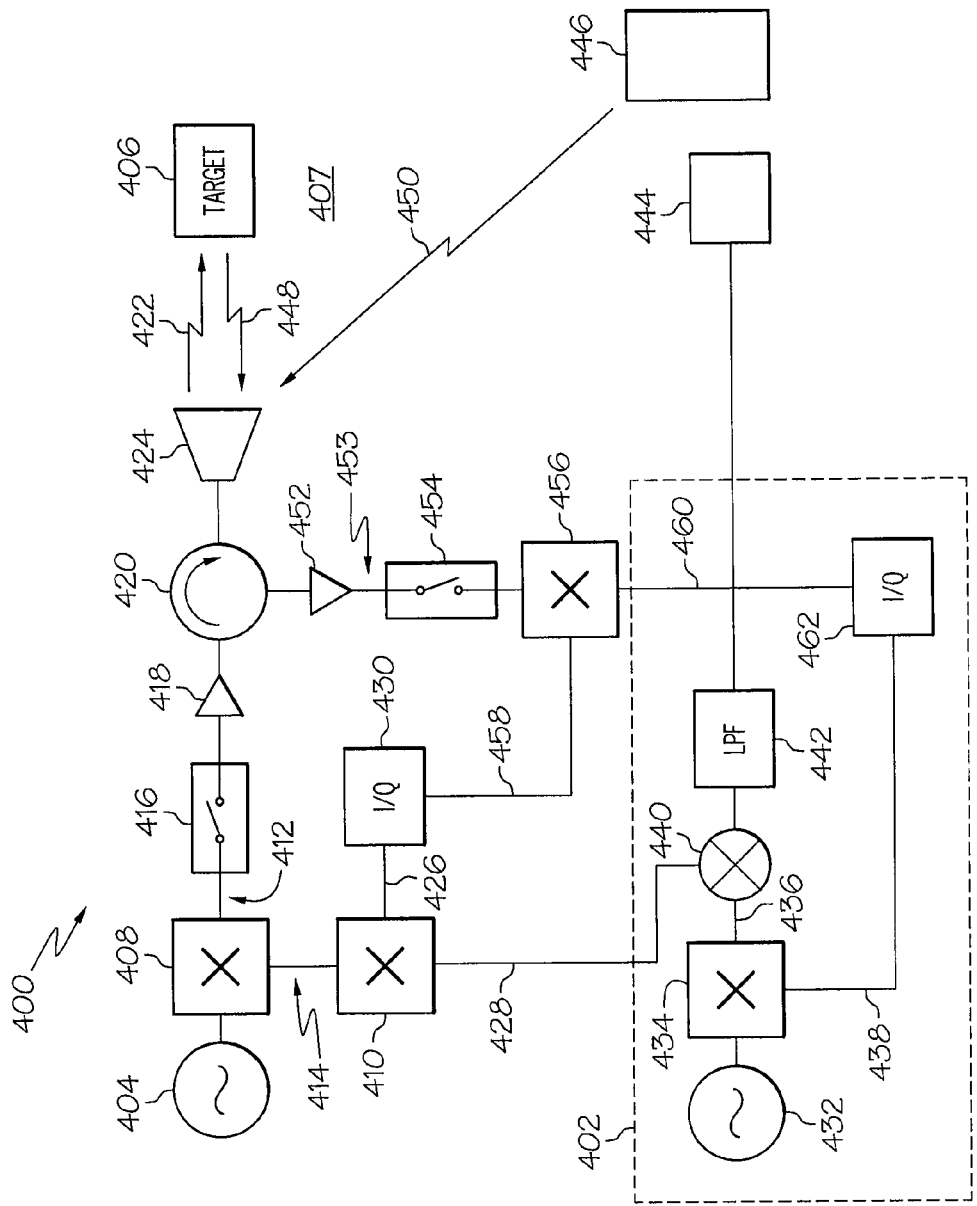
FIG. 4 is a schematic diagram of an example of a radar cross section measurement device including a spectral tagging module in accordance with an embodiment of the present disclosure.

FIG. 4 is a schematic diagram of an example of a radar cross section measurement device 400 including a spectral tagging module 402 in accordance with an embodiment of the present disclosure. The RCS measurement device 400 may form part of or may be used for the radar system or RCS measurement system 104 in FIG. 1. The device 400 may include a first coherent signal generator 404 to generate a test signal at a selected test frequency to be transmitted to a target 406 for measuring the RCS of the target 406. The test signal may be a coherent sinusoidal signal. The test signal generated by generator 404 may be split or divided into three paths by two power dividers or splitters 408 and 410. The first power divider 408 may split the test signal into a transmit test signal in transmit path 412 and a first sample signal of the transmit test signal in circuit path 414. The transmit test signal may be pulsed by a radio frequency (RF) switch 416 and amplified by an amplifier 418. A circulator 420 passes the pulsed transmit test signal 422 to an antenna 424 for transmission of the pulsed, un-modulated transmit test signal 422 to the target 406 for measuring the RCS of the target 406.

The second power divider 410 or splitter splits the first sample of the transmit test signal via circuit path 414 into a second sample of the transmit test signal in circuit path 426 and a third sample of the transmit test signal in circuit path 428. The second sample of the transmit test signal may be used as a reference signal for baseband channel detection. That is, the second sample of the transmit test signal may be used as a reference for detecting un-modulated, reflected signals received by the radar system or RCS measurement device 400 in a first coherent receiver 430. The first coherent receiver 430 may be an I/Q (quadrature) mixer or similar device.

The system 400 may also include a second coherent signal generator 432 to generate a tagging signal at the selected test frequency shifted or offset by a chosen spectral tagging modulation frequency. Accordingly, the second coherent generator 432 may generate a coherent sinusoidal modulation signal for spectral tagging a clutter source that is offset from the transmitted test signal. A third power divider 434 may split the tagging signal into a first sample tagging signal in circuit path 436 and a second sample tagging signal in circuit path 438. A mixer 440 may mix the first sample tagging signal and the third sample of the transmit test signal. The system 400 may include a low pass filter (LPF) 442 to filter an output from the mixer 440 to form a resulting signal. The resulting signal may be applied to an EM tagging device 444 for driving the EM tagging device 444 to spectrally tag a clutter source 446. The resulting signal may be a modulated signal at the selected test frequency which is coherent with the un-modulated transmit test signal.

The reflected signals 448 and 450 from the target 406 and clutter source 446 and received by the antenna 424 include both modulated and un-modulated components. The reflected signals 448 and 450 pass through the circulator 420 and are amplified by the amplifier 452 in a receive path 453. A RF switch 454 coupled to the amplifier 452 may range gate or time gate the received reflected signals 448 and 450 after amplification. The receive signal is time-gated by RF switch 454 to isolate the very large transmitter leakage coupling through the circulator 420 from the very weak reflections or reflected signals 448 from the target 406. The RF switch 454 is open during the time the system 400 is transmitting, preventing this large signal in the path 453 from entering the receive components 462 or 430. The RF switch 454 is then closed after sufficient time has passed for the EM energy to travel to the target 406 and back, allowing the target reflections to be detected by the first coherent receiver 430.

A receive path power divider 456 or splitter may split the reflected signals received by the RCS measurement system 400 or radar system into a first sample of the received reflected signals in receive circuit path 458 and a second sample of the received reflected signals in receive circuit path 460. The first coherent receiver 430 may detect a time-average of the un-modulated components of the received reflected signals using the second sample of the transmit test signal via circuit path 426 as the reference signal, wherein the reference signal is un-modulated. The first coherent receiver 430 may be an I/Q (quadrature) mixer or similar device for detecting a time-average of the un-modulated components of the received reflected signals.

The system 400 may include a second coherent receiver 462 to detect a time-average of the modulated components of the received reflected signals using the second sample tagging signal via circuit path 438 as a reference. The second coherent receiver 462 may be an I/Q (quadrature) mixer or similar device. The RCS of the target 406 with clutter contamination removed may be determined from the detected un-modulated components of the first coherent receiver 430 and modulated components of the second coherent receiver 462 of the received reflected signals 448 and 450 both with and without the target 406 in the RCS range 407. Which scattered signals 448 and 450 are from the clutter source 446 and EM tagging device 444 at the selected frequency may be determined by multiplying the ratio of the scattered signals at the selected frequency without the target 406 in the RCS range 407 to the scattered signals at the sideband frequency without the target 406 in the RCS range 407 times the scattered signals at the sideband frequency with the target 406 in the RCS range 407. A radar cross section of the target 406 may then be determined by subtracting the scattered signals from the clutter source 446 (described above) from an average scattered signal, driven at the selected frequency with the EM tagging device 444 between the first and second RCS states, with the target 406 in the RCS range 407.

The second coherent signal generator 432, mixer 440, LPF 442 and second coherent receiver 462 may define or form at least part of the spectral tagging module 402.

FIG. 5 is a schematic diagram of another example of a radar cross section measurement device 500 including a spectral tagging module 502 in accordance with another embodiment of the present disclosure. The device 500 may include a coherent signal generator 504 to generate a test signal at a selected test frequency. A power divider 506 may split the test signal into an un-modulated transmit test signal and a sample of the transmit test signal. A RF pulse forming switch 508 coupled to the power divider 506 may form the transmit test signal into pulses for transmission by an antenna 510 to a target 512. The transmit test signal pulses may be amplified by an amplifier 514 and passed through a circulator 516 to the antenna 510.

The RCS measurement device 500 or radar system may also include a pulse generator 518 to generate timing pulses to control timing of the RF pulse forming switch 508. A sample of the timing pulses sent to the RF pulse forming switch 508 are sent to a counter 520 or similar device from the pulse generator 518 to provide modulated tagging signals that change state with each pulse at a predefined modulation frequency. The counter 520 may be a divide-by-two counter to provide the modulated tagging signals that change state with each pulse. The modulated tagging signal is useable to toggle an EM tagging device 522 or EM surface, similar to that previously described, between a first RCS state and second RCS state with each pulse at a predefined modulation rate to spectrally tag a clutter source 524. Accordingly, the EM tagging device 522 may be toggled between two distinct states using a square-wave signal pattern from the pulse generator 518 and divide-by-two counter 520. The frequency of the square wave modulation may be ½ the pulse repetition frequency of the transmitted test signal to the target 512. The frequency of the square wave modulation may also be ½N of the pulse repetition frequency, where N may be an integer greater than or equal to 1. For example, ¼, ⅙, or higher divisions of the pulse repetition frequency could also be used. For these higher order wave modulations, the pulses must be divided into even and odd groups of N pulses.

Reflected signals received by the antenna 510 will pass through the circulator 516 and may be amplified by another amplifier 526 in the receive path of the RCS measurement device 500. The received reflected signal may be gated by an RF switch 528. The gated signal from the RF switch 528 may be detected by a coherent receiver 530, I/Q (quadrature) mixer or similar device using a sample of the transmit test signal from the power divider 506. The signal detected by the I/Q (quadrature) mixer 530 may be processed by a signal processor 532 to provide the radar cross section of the target 512 with any clutter contamination removed.

The signal processor 532 may be a digital signal processor (DSP). An analog-to-digital (A/D) converter 534 may receive the detected, reflected signals from the I/Q (quadrature) mixer 530 and may convert the reflected signals to digital pulse signals. The DSP 532 processes the digital pulse signals from the A/D converter 534. Even numbered pulse signals may correspond to the EM tagging device 522 in a first radar cross section state and the odd numbered pulse signals may correspond to the EM tagging device 522 in the second radar cross section state. The DSP 532 may compute a sum of the even and odd numbered pulse signals to provide a sum term containing only un-modulated components of the received reflected signals. The DSP 532 may compute a difference of the even and odd numbered pulse signals to provide a difference term containing only modulated components of the received reflected signals. The radar cross section of the target 512 with the reflected signals from the clutter source 524 and EM tagging device 522 removed may be determined by removing or subtracting their un-modulated clutter contributions to the received reflected signals from the combined or total received reflected signal. The un-modulated contributions of the clutter source 524 and EM tagging device 522 are determined by monitoring the variations in the modulated components of the received reflected signals. Variations in the un-modulated components of the received reflected signals may be adjusted or compensated and removed or subtracted from the reflected signals to provide the radar cross section of the target 524, as described in more detail with reference to FIG. 7.

Figure 6:
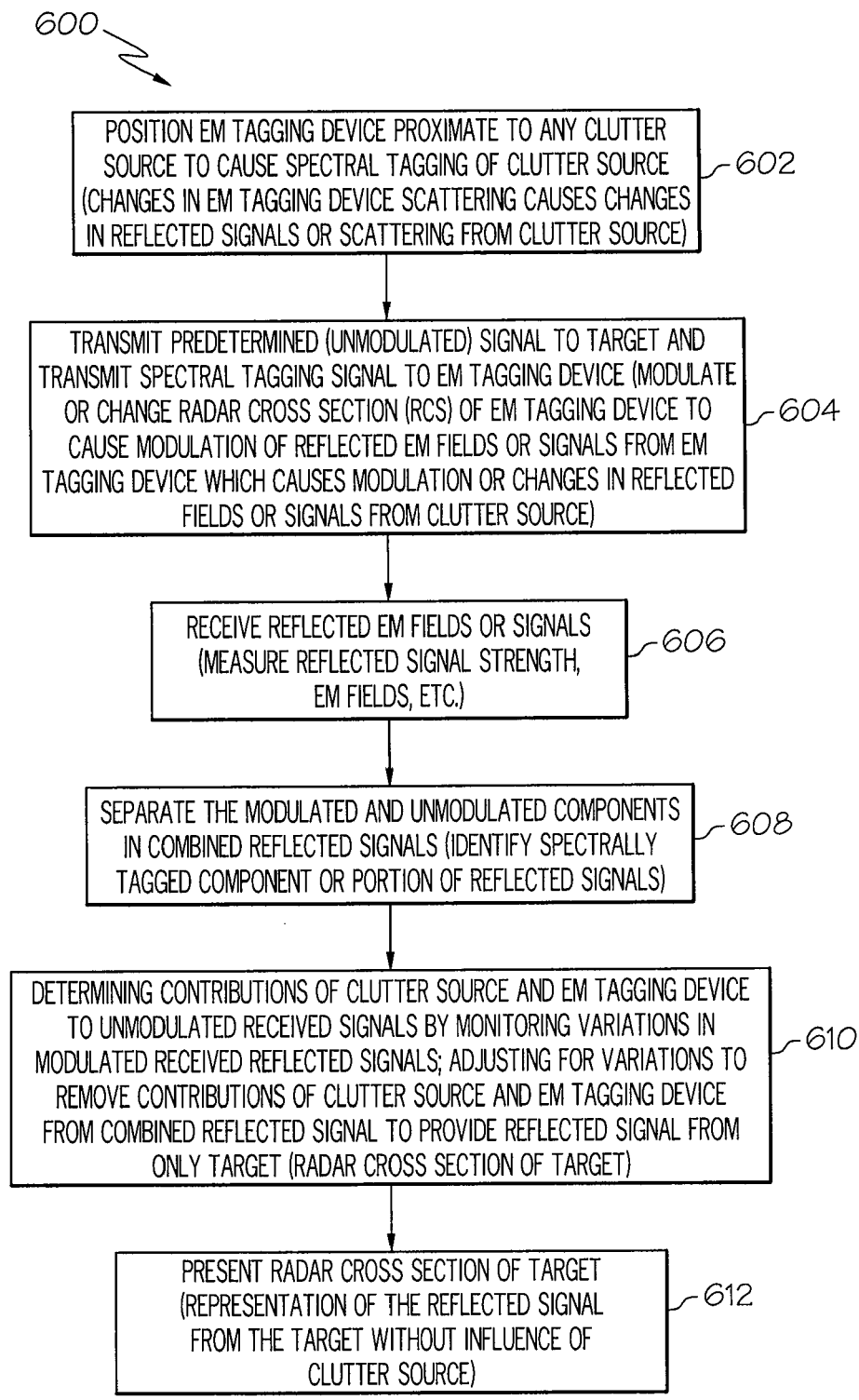
FIG. 6 is a flow chart of an example of a method for measuring a radar cross section of a target and removing clutter from the radar cross section measurement in accordance with an embodiment of the present disclosure.

FIG. 6 is a flow chart of an example of a method 600 for measuring a radar cross section of a target and removing clutter from the radar cross section measurement in accordance with an embodiment of the present disclosure. The method 600 may be embodied in the system 100 of FIG. 1 or performed by the system 100. In block 602, an EM tagging device or EM surface may be positioned proximate to any clutter sources to cause spectral tagging of the clutter sources. Similar to that described herein, a clutter source may be spectrally tagged by an EM tagging device in that any changes in the EM tagging device scattering causes changes in reflected signals or scattering from the associated clutter source. The EM tagging device is placed relative to or in such proximity of the associated clutter source to cause the spectral tagging.

In block 604, a predetermined signal may be transmitted from a RCS measurement system or radar system, such as the system 100, to a target for measuring the RCS of the target. The predetermined signal may be an un-modulated signal. A spectral tagging signal may also be transmitted to the EM tagging device. The spectral tagging signal may be modulated to modulate or cause changes to the RCS of the EM tagging to cause modulation of reflected EM fields or signals from the EM tagging device which in turn causes modulation or changes in the reflected fields or signals from the clutter source.

In block 606, reflected or scattered EM fields or signals may be received by the system. The signal strength, amplitude and phase of the reflected signals or other parameters characterizing the reflected or scattered EM fields or signals may be measured to determine or measure the RCS of the target.

In block 608, the modulated and un-modulated components of the received signals or combined received signals may be separated to identify the spectrally tagged components or portions of the reflected or scattered signals or fields.

In block 610, the contribution of the clutter source and EM tagging device to the un-modulated received signals may be determined by monitoring the variations in the modulated receive signals. Variations in the un-modulated received signals or un-tagged component of the reflected signals caused by the clutter source and EM tagging device may be compensated or adjusted to remove their contributions of the clutter source and EM tagging device from the combined reflected signal or field to provide the reflected signal or field from the target with reflected or scattered signals or fields from the clutter source and EM tagging device and substantially any interactions between the clutter source and target removed. The resulting signal or field will correspond to the RCS of the target.

In block 612, the RCS of the target may be presented on an output device of the system. The output device may be a monitor or display, a printer or other device capable of presenting the RCS to a user. The RCS may be a representation of the reflected or scattered signal or field from the target substantially without an influence or contamination of the clutter source.

Figure 7:
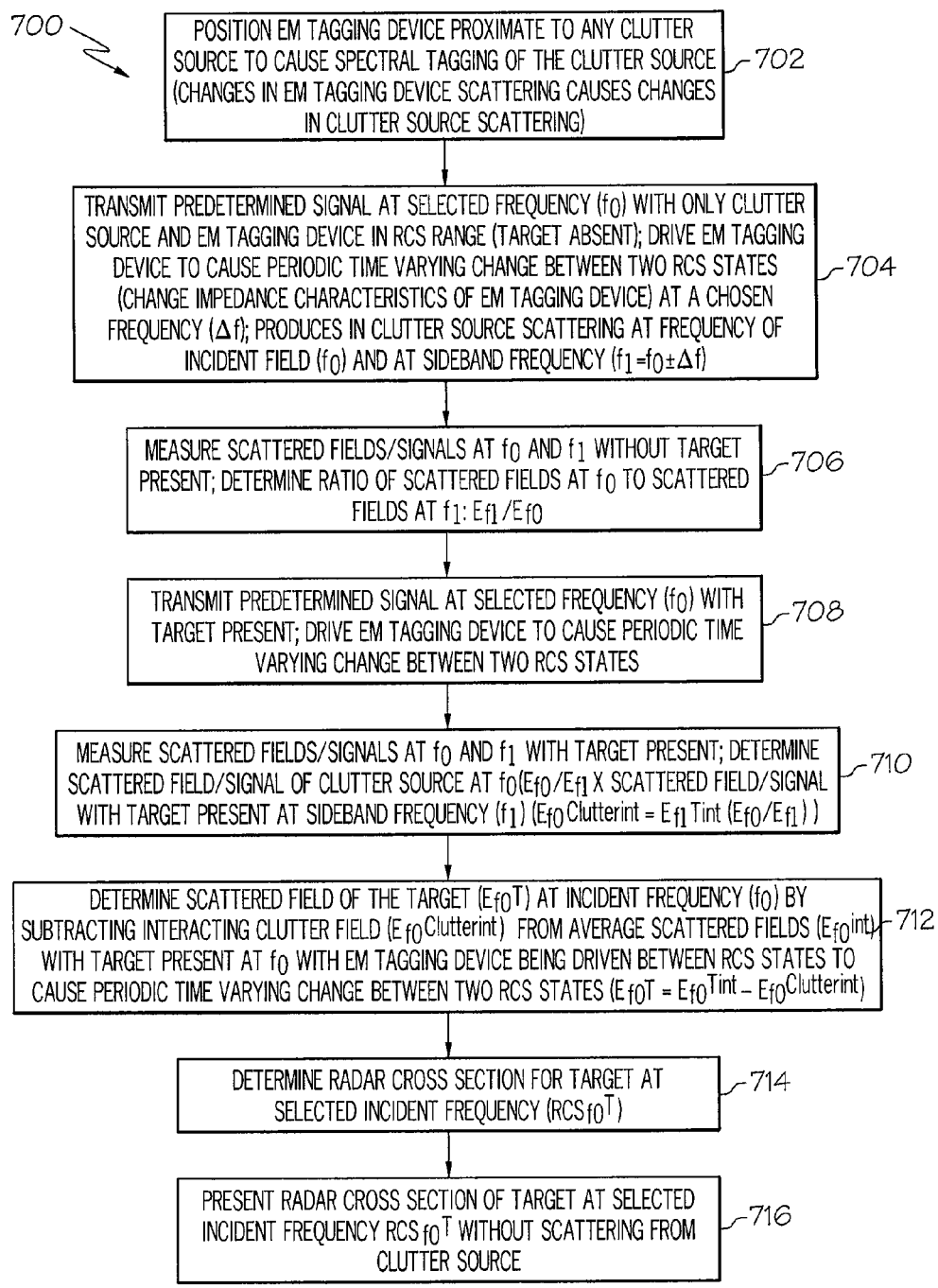
FIG. 7 is a flow chart of an example of a method for measuring a radar cross section of a target and removing clutter from the radar cross section measurement in accordance with another embodiment of the present disclosure.

FIG. 7 is a flow chart of an example of a method 700 for measuring a radar cross section of a target and removing clutter from the radar cross section measurement in accordance with another embodiment of the present disclosure. The method 700 may be embodied in the system 100 of FIG. 1 or may be performed by the system 100.

In block 702, an EM tagging device, similar to EM tagging device 118 in FIG. 1, may be positioned proximate to any clutter source in the RCS range to cause spectral tagging of the clutter source as described herein, wherein changes in the EM tagging device scattering or reflected signals causes changes in the scattering or reflected signals from the clutter source.

In block 704, a predetermined test signal at a selected frequency ($f_0$) may be transmitted with only the clutter source and EM tagging device present in the RCS range (target absent). The EM tagging device is also driven or activated by a predefined spectral tagging signal at a chosen spectral tagging frequency ($\Delta f$) to cause a periodic time varying change of the RCS characteristics of the EM tagging device between two RCS states. The time varying change may be a change in the impedance characteristics of the EM tagging device to cause the change in RCS states. The predefined tagging signal driving the EM tagging device produces, from the clutter source, scattering or reflected signals or fields, at a frequency of the incident field or predetermined signal ($f_0$) and at a sideband frequency. The sideband frequency is a function of the frequency of the incident frequency or transmitted test frequency and the spectral tagging frequency ($f_1 = f_0 \pm \Delta f$). As previously described, the EM tagging device may be an EM surface, such as the examples described with reference to FIGS. 2 and 3 or some other configuration depending upon the RCS measurement range or environment and the nature of the clutter source. As previously described, the EM tagging device is placed or positioned relative to the clutter source or within a predetermined proximity of the clutter source to cause the changes in the scattered or reflected fields of the scatter source in response to the changes or modulation of the RCS of the EM tagging device.

In block 706, an amplitude and phase of the scattered or reflected fields or signals at frequencies $f_0$ and $f_1$ without the target present may be measured. A ratio of the signal strength or power of scattered fields at $f_0$ to scattered fields at $f_1$ may be determined or calculated ($E_{f0}/E_{f1}$).

In block 708, the predetermined test signal at the selected frequency ($f_0$) may be transmitted with the target present in the RCS range. The EM tagging device may also be driven or activated by the predefined tagging signal at the chosen spectral tagging frequency ($\Delta f$) to cause periodic time varying changes in the EM tagging device between at least the two RCS states.

In block 710, the amplitude and phase of the scattered fields or signals at the selected frequency or incident frequency $f_0$ and the sideband frequency ($f_1$) with the target present may be measured. The scattered fields or signals from the clutter source at $f_0$ with the target present ($E_{f0}^{Clutterint}$) may be determined by multiplying the ratio determined in block 706 of the scattered fields at $f_0$ to the scattered fields at $f_1$ without the target present times the scattered field or signal with the target present at the sideband frequency $f_1$ which is represented by Equation 1:

$$E_{f0}^{Clutterint} = E_{f1}^{Tint}(E_{f0}/E_{f1}) \qquad \text{Equation 1}$$

Where $E_{f0}^{Clutterint}$ is the scattered fields or signals from the clutter source or the clutter interference in the presence of target interaction at the incident or test frequency $f_0$. $E_{f1}^{Tint}$ is the scattered field or signal with the target present at the sideband frequency $f_1$.

In block 712, the scattered fields or signals of the target ($E_{f0}^T$) at the incident or transmitted test frequency $f_0$ may be determined by subtracting the interacting clutter field ($E_{f0}^{clutterint}$) from the average scattered fields or signals ($E_{f0}^{Tint}$) with the target present at frequency $f_0$ with the EM tagging device being driven between RCS states to cause a periodic time varying change between the RCS states. This calculation is represented by equation 2:

$$E_{f0}^T = E_{f0}^{Tint} - E_{f0}^{Clutterint} \qquad \text{Equation 2}$$

In block 714, the RCS of the target at the selected incident frequency or transmitted test frequency $f_0$ ($RCS_{f0}^T$) with the clutter interference removed corresponds to $E_{f0}^T$ in block 712:

$$RCS_{f0}^T = RCS_{Known}^{Thry} \times |E_{f0}^T/E_{Known}|^2 \qquad \text{Equation 3}$$

Where $RCS_{Known}^{Thry}$ is the theoretical RCS value of a known target (typically a sphere) and $E_{Known}$ is the measured field or signal from the known target at frequency $f_0$ in the RCS range.

In block 716, the radar cross section of the target may be presented on an output device of an RCS measurement system or radar system, such as the system 100 in FIG. 1 without scattering or influence from the clutter source Although specific embodiments have been illustrated and described herein, those of ordinary skill in the art appreciate that any arrangement which is calculated to achieve the same purpose may be substituted for the specific embodiments shown and that the embodiments herein have other applications in other environments. This application is intended to cover any adaptations or variations of the present disclosure. The following claims are in no way intended to limit the scope of the disclosure to the specific embodiments described herein.

What is claimed is:

1. A system for performing radar cross section measurements of a target, comprising
    a radar system;
    an antenna associated with the radar system to transmit signals and to receive reflected signals from the target and a clutter source; and
    an electromagnetic (EM) tagging device to spectrally tag the clutter source, wherein the EM tagging device comprises a changeable radar cross section.

2. The system of claim 1, further comprising:
    a module associated with the radar system to identify a spectrally tagged component of reflected signals received by the radar system from the target, the clutter source and the EM tagging device and to provide a radar cross section of the target with reflected signals from the clutter source and EM tagging device and any electromagnetic interaction between the clutter source and the target removed; and
    an output device to present the radar cross section of the target with reflected signals from the clutter source and EM tagging device and any electromagnetic interaction between the clutter source and the target removed.

3. The system of claim 2, wherein the module associated with the radar system comprises a module to monitor the spectrally tagged component of the reflected signals received by the radar system, to compensate for variations in an un-tagged component of the reflected signals caused by the clutter source and EM tagging device, and to subtract contamination caused by the clutter source and EM tagging device and their interactions with the target.

4. The system of claim 1, wherein the EM tagging device comprises an EM surface capable of being changed or modulated between radar cross section states to spectrally tag the clutter source.

5. The system of claim 4, further comprising a component to modulate or change a radar cross section of the EM surface to cause modulation of reflected EM signals from the EM surface, the EM surface being located proximate to the clutter source so that modulation of the reflected EM signals from the EM surface causes modulation of reflected signals from the clutter source.

6. The system of claim 4, further comprising a component to cause a predetermined periodic time varying change of the EM surface to modulate the EM surface between two or more radar cross section states to spectrally tag the clutter source.

7. The system of claim 1, further comprising:
    a spectral tagging module to generate a coherent modulated signal at a selected modulation frequency to drive the EM tagging device, wherein the selected frequency is offset from an un-modulated test frequency of the predetermined radar signal;
    a separate receive channel offset from the test frequency by the selected modulation frequency to separate modulated and un-modulated components of the received reflected signals to provide the radar cross section of the target with interference from the clutter source removed.

8. The system of claim 1, further comprising:
    a spectral tagging module to generate a modulated signal at a selected pulse repetition frequency different from a pulse repetition frequency of the predetermined radar signal to drive the EM tagging device, wherein the EM tagging device is toggled between two distinct radar cross section states with each pulse of the square wave modulated signal; and
    a signal processor to separate modulated and un-modulated components of the received reflected signals to provide the radar cross section of the target with interference from the clutter source removed, wherein alternate pulses of the received reflected signals respectively represent a first radar cross section state of the EM tagging device and a second radar cross section state of the EM tagging device, and wherein a sum of the alternate pulses represents the un-modulated components of the received reflected signal and a difference of the alternate pulses represents the modulated components of the received reflected signal.

9. The system of claim 1, wherein the radar system comprises:
a coherent signal generator to generate a test signal at a selected test frequency;
a power divider to split the test signal into an un-modulated transmit test signal to be transmitted by an antenna and a sample of the transmit test signal;
a radio frequency (RF) pulse forming switch to form the un-modulated transmit test signal into pulses for transmission from the antenna;
a pulse generator to control timing of the RF pulse forming switch;
a counter to receive pulse signals from the pulse generator to provide a modulated tagging signal that changes state at a predefined modulation frequency, wherein the modulated tagging signal is useable to toggle the EM tagging device between a first radar cross section state and a second radar cross section state to spectrally tag the clutter source;
a coherent receiver to detect the reflected signals received by the radar system; and
a signal processor to process the reflected signals to provide the radar cross section of the target.

10. A method for performing radar cross section measurements of a target, comprising:
transmitting a predetermined signal to the target;
spectrally tagging a clutter source using an EM tagging device comprising a changeable radar cross section; and
removing a contribution of the clutter source and any interaction of the clutter source with the target using the spectral tagging to provide the radar cross section of the target without influence of the clutter source.

11. The method of claim 10, further comprising identifying a spectrally tagged component of reflected signals received from the target, the clutter source and the EM tagging device to provide the radar cross section of the target with reflected signals from the clutter source and EM tagging device and any electromagnetic interaction between the clutter source and the target removed.

12. The method of claim 10, further comprising:
transmitting an un-modulated signal to the target; and
transmitting a modulated tagging signal to the EM tagging device to cause the EM tagging device to change or modulate between radar cross section states to spectrally tag the clutter source.

13. A method for performing radar cross section measurements of a target, comprising:
transmitting a predetermined signal to the target;
spectral tagging a clutter source using an EM tagging device to cause changes in an electromagnetic signal reflected by the clutter source when the predetermined signal is transmitted to the target, the clutter source and the EM tagging device;
receiving reflected signals from the target, the clutter source and the EM tagging device;
determining contributions of the clutter source and the EM tagging device to an un-modulated component of the received reflected signals by monitoring variations in a modulated component of the received reflected signals;
adjusting for the variations in the un-modulated component to remove contributions of the clutter source and the EM tagging device and any interactions with the target from the received reflected signals to provide the radar cross section of the target without influence of the clutter source; and
presenting the radar cross section of target without influence of the clutter source.

14. The method of claim 13, wherein transmitting the predetermined signal to the target comprises transmitting an un-modulated signal to the target, the method further comprising transmitting a modulated tagging signal to the EM tagging device to cause the EM tagging device to change or modulate between radar cross section states to spectrally tag the clutter source.

15. The method of claim 14, wherein monitoring variations in the modulated component of the reflected signals comprises separating modulated and un-modulated components in the reflected signals.

16. The method of claim 14, wherein monitoring the variations in the modulated component of the reflected signals allows compensation of variations in the un-modulated component of the reflected signal due to the clutter source and EM tagging surface for an impact of interactions with the target, and subtracting or removing the adjusted un-modulated clutter source, EM tagging surface and interaction contributions from the reflected signals.

17. The method of claim 13, wherein the EM tagging device is an EM surface and wherein the method further comprises applying the tagging signal to the EM surface to cause a predetermined periodic time varying change to the EM surface to modulate the EM surface between a first radar cross section state and a second radar cross section state to spectrally tag the clutter source.

18. A method for performing radar cross section measurements of a target, comprising:
transmitting test pulse signals at a selected pulse repetition frequency to the target;
generating tagging pulses to toggle an EM tagging device between a first radar cross section (RCS) state and a second RCS state with each successive tagging pulse, wherein even numbered pulses correspond to the first RCS state and odd numbered pulses correspond to the second RCS state, wherein the EM tagging device is placed proximate to a clutter source to spectrally tag the clutter source;
computing a sum of the even and odd numbered reflected pulses to represent un-modulated reflected signals;
computing a difference of the even and odd numbered reflected pulses to represent modulated reflected signals; and
determining the radar cross section of the target without interference of the clutter source by monitoring the modulated reflected signals.

* * * * *